Nov. 29, 1927.
H. W. EGGERS
1,650,825
PUMP JACK
Filed Nov. 30, 1925
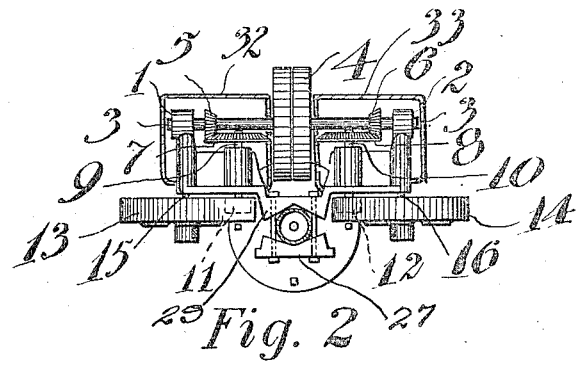
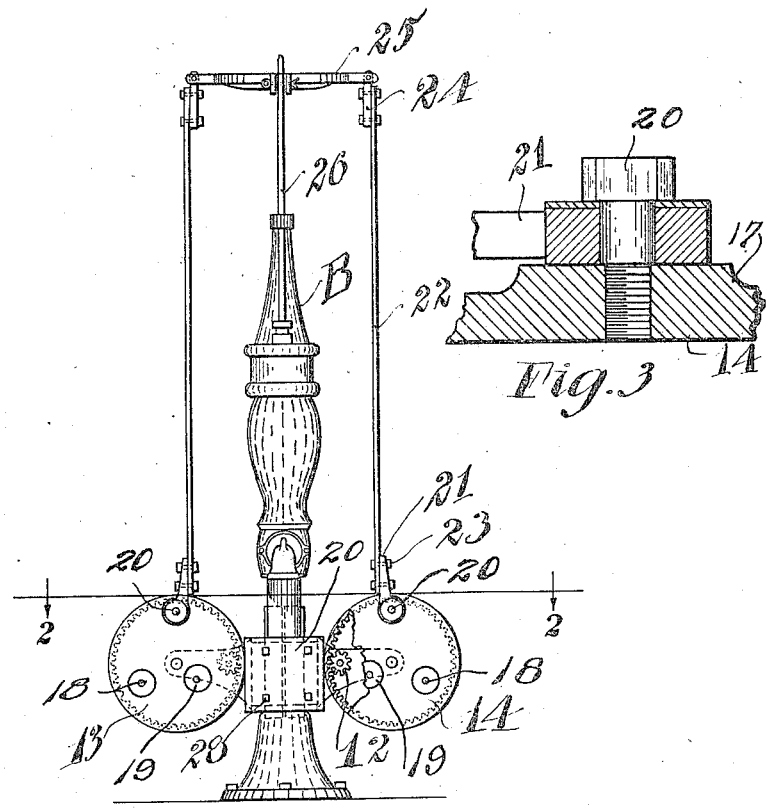
Inventor
Henry W. Eggers Patented Nov. 29, 1927.

1,650,825

UNITED STATES PATENT OFFICE.

HENRY W. EGGERS, OF PRESCOTT, WISCONSIN.

PUMP JACK.

Application filed November 30, 1925. Serial No. 72,195.

The present invention relates to a pump jack.

An object of the invention is to make a simple pump jack having a high degree of efficiency.

Another object is to mount a pump jack on a pump so that the pull of the driving force will be in substantially direct line with the axis of the pump and the arrangement of the driving mechanism to counterbalance all torques and stresses being generated by the driving force thereof.

In order to attain these objects, there is provided, in accordance with one feature of the invention, a bearing plate firmly secured to the housing of a pump, said bearing plate having a transverse shaft mounted for rotation therein, with a pulley mounted centrally of said shaft. A pair of drive pinions mounted on the shaft are positioned to actuate two beveled gears journaled in the bearing plate. The shafts upon which said bevel gears are mounted extend beyond the front surface of said bearing plate, each being provided with a small spur gear thereon. The spur gears are mounted to engage a pair of internally toothed gears, each of said gears having drive arms pivotally connected thereto and extending vertically upward therefrom. The arms are pivotally connected at their upper ends to a cross beam mounted upon a lift rod of the pump on which the device is mounted.

These and other features of the invention, not specifically mentioned, will be more fully brought out in the following description and the accompany drawings, wherein:

Figure 1, is a view in front elevation of a pump having the device mounted thereon, a portion of a gear being broken away to show the position of a spur gear therein.

Figure 2, is a sectional view on the line 2—2 of Figure 1; and

Figure 3, is an enlarged view of a pivotal rod connection.

Referring to the drawings in detail, a plate A has thereon a pair of journals 1 and 2, in which is mounted for rotation a shaft 3. The shaft has a driven pulley 4 keyed thereto which may be actuated from a suitable source of power by means of a belt, not shown. Pinions 5 and 6 are mounted on the shaft 3 on either side of the pulley 4, to engage beveled gears 7 and 8, which are mounted upon shafts 9 and 10 journaled in the bearing plate to extend entirely through said plate and project beyond the other face thereof. Mounted upon the other ends of the shafts 9 and 10 from the gears 7 and 8 are spur gears 11 and 12 which engage internally toothed gears 13 and 14 pivoted for rotation upon stub shafts 15 and 16. The mechanism on the rear of the mounting plate is encased in a pair of cover members 32 and 33 which may be of sheet metal.

The forward faces of the internally toothed gears are provided with a plurality of studs 17, 18, and 19, spaced outwardly from the center at varying distances, the studs on the face of one gear being reversed in position from those on the other gear. A bolt 20, having a threaded lower portion of a size to engage the tapped openings in the studs and an enlarged upper portion to act as a drive pin is provided for each of the gears 13 and 14. A pair of bearing members 21 have openings therein of a size to journal the enlarged upper portion of the bolts 20 and are connected to push rods 22 as by means of bolts 23. The push rods may be of wood, and are each provided at their upper ends with a second bearing member 24 having pivotal engagement with a yoke 25. The yoke is connected at its center point to the actuating rod 26 of a pump B, with which the jack is intended to be used.

In operation, the pulley 4 is rotated from a suitable source of power by means of a belt, not shown, to rotate the shaft 3. This rotates the pinions 5 and 6, which, being positioned at opposite sides of the beveled gears, 7 and 8, cause the beveled gears to rotate in opposite directions. This in turn, by means of shafts 9 and 10 and the spur gears 11 and 12, causes the internally toothed gears 13 and 14 to rotate in opposite directions. The push rods 22 translate the rotary motion of the internally toothed gears into a vertical reciprocatory motion which drives the pump rod 26 up and down to draw water from a well with which it is associated. The pull of the drive belt is in the same plane as the central vertical axis of the pump which eliminates any torque about said pump axis and permits the jack to be firmly mounted on the pump casing by means of a clamp 27 which connects it to the pump casing. Bolts 28 penetrate the clamp 27 and the mounting plate A to firmly clamp the parts to the pump B.

The pinions 5 and 6 engage the beveled gears 7 and 8 on opposite sides, causing the thrust of said gears to be in opposite directions about the center of the plate A upon which they are mounted, thus neutralizing the torques thereof. The spur gears 11 and 12 are also rotated in opposite directions which neutralizes the torque at this point. The rotation of the internally toothed gears 13 and 14, being also in opposite directions, causes the push rods 22 to be moved equal distances from the point of rotation of the internally toothed gears 13 and 14 and this also causes a balance of the torque. The plate A is provided with an offset central portion 29 which brings the push rods 22 into a plane with the vertical axis of the pump. Since the plate A is supported on the pump casing, this position of the push rods 22 in a plane with the central vertical axis of the pump gives a straight up and down motion to the pump rod with no displacing force acting thereon as where the push rods move beyond the plane of said vertical axis.

By changing the position of the push rod bearings 21 from one set of studs, such as 17, to another set, such as 18, located at a different distance from the center, the length of the stroke of the actuating rod 26 may be varied and the jack thus adapted for wells of different depth and pumps of different construction and capacities.

What I claim is:

In combination with a pump and rod, a mounting plate having an offset central portion shaped to fit a side of said pump, a clamp member cooperating with said central portion to clamp the plate to said pump, a pair of bearing journals carried by said plate, a shaft rotatably mounted therein, bevel gears mounted on said shaft to rotate therewith, a pair of shafts pivotally mounted on said plate to extend therethrough, and having beveled gears carried thereby to cooperate with the bevel gears of said shaft, a pinion borne by each of said pairs of shafts, and a toothed wheel mounted on either side of said shaft in a plane substantially centrally of said pinion to be operated by said pinions and having adjustable operative connection with said pump rod.

In testimony whereof I affix my signature.

HENRY W. EGGERS.